United States Patent Office 2,857,383
Patented Oct. 21, 1958

2,857,383

AMINO ESTERS OF THIANAPHTHENEALKANOIC ACIDS

Walter Voegtli, Evanston, Ill., assignor to G. D. Searle & Co., Chicago, Ill., a corporation of Delaware No Drawing. Application March 29, 1956
Serial No. 574,640

12 Claims. (Cl. 260—268)

The present invention relates to amino esters of thianaphthenealkanoic acids and to non-toxic salts thereof. It is specifically concerned with amino esters which, in the forms of their free bases, can be represented by the structural formula

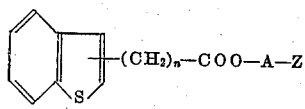

wherein $n$ is 0, 1, 2, 3, or 4; A is a bivalent hydrocarbon radical containing fewer than 9 carbon atoms and separating the groups attached thereto by at least 2 carbon atoms; and Z is a nitrogen-containing group such as di(lower)alkylamino, diallylamino, piperazino, pyrrolidino, alkylated pyrrolidino, piperidino, and alkylated piperidino radicals. More particularly, the radical A can represent such straight- and branched-chain alkylene radicals as propylene, butylene, amylene, and hexylene, as well as such polymethylene radicals as ethylene, trimethylene, tetramethylene, pentamethylene, and hexamethylene. It can also represent such aryl substituted alkylene radicals as phenylethylene, the common features of the foregoing radicals being that they contain fewer than 9 carbon atoms and interpose at least 2 carbon atoms between the groups to which they are attached. The group Z can represent dialkylamino radicals wherein the alkyl groups contain fewer than 9 carbon atoms. Representative of such radicals are dimethylamino, diethylamino, dipropylamino, dibutylamino, dihexylamino, dioctylamino, and homologs and branched-chain isomers thereof, as well as dialkylamino groups containing mixed alkyl radicals, such as methylethylamino, methylpropylamino, and ethylpropylamino. The group Z can also represent unsaturated radicals such as diallylamino and radicals containing a plurality of nitrogen atoms, such as piperazino. In addition Z can represent pyrrolidino and piperidino, as well as lower alkyl substituted pyrrolidino and lower alkyl substituted piperidino radicals containing fewer than 9 carbon atoms. The common characteristics of these monocyclic radicals are that the single nitrogen atom is bonded by two of its valences to different carbon atoms of an alkylene chain of 4 to 7 carbon atoms, 4 to 5 of which carbon atoms are in annular position with the nitrogen atom.

The foregoing structural formula is a representation of the 3-thianaphthene derivatives of the structural formula

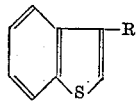

and of the 2-thianaphthene derivatives of the structural formula

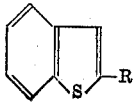

in which formulas R represents the group

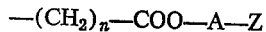

One of the methods suitable for the manufacture of compounds of this invention is the treatment of the appropriate thianaphthenecarboxylic acid, thianaphtheneacetic acid, thianaphthenepropionic acid, thianaphthenebutyric acid, or thianaphthenevaleric acid with a dialkylaminoalkyl halide, a substituted dialkylaminoalkyl halide, an unsaturated analog of a dialkylaminoalkyl halide, or a cyclic aminoalkyl halide. This reaction can be carried out in an organic solvent such as chloroform or isopropyl alcohol, and a reaction period of convenient length is achieved by conducting the reaction approximately at the reflux temperature of the mixture. This can be done by heating the reaction mixture under reflux for a period of a few hours, or by vaporizing the solvent with a stream of nitrogen or air over a period of a few hours while the mixture is maintained near its boiling point. The product of the reaction can be obtained as a hydrohalide salt by removal of the solvent, or it can be converted to the free base by treatment of an aqueous solution of the non-volatile residue from the reaction mixture with an inorganic base such as potassium carbonate. In order to convert the hydrohalide salt to the free base, it is desirable to conduct the operations rapidly and in the cold in order to minimize hydrolysis of the ester grouping.

As a specific illustration of the procedure, a solution of 3-thianaphthenecarboxylic acid, 3-diethylaminopropyl chloride and isopropyl alcohol is heated under reflux for 24 hours. The 3-diethylaminopropyl ester hydrochloride of 3-thianaphthenecarboxylic acid is obtained by concentrating the reaction mixture and diluting it with ether. The corresponding free base is obtained by treating a cold, aqueous solution of the hydrochloride with potassium carbonate and extracting with ether. The organic free base dissolves in the ethereal phase and can be recovered by vaporization of the solvent.

In the manufacture of the piperazinoalkyl esters of this invention, it is suitable to convert the thianaphthenealkanoic acid to the corresponding acid chloride and then, by reaction with a haloalkanol, to a haloalkyl ester of the thianaphthenealkanoic acid. The latter compound is then reacted with piperazine to form the desired amino ester. Thus, the β-bromoethyl ester of 3-thianaphthenecarboxylic acid, obtained by the reaction of 3-thianaphthenecarbonyl chloride with 2-bromoethanol, is treated with piperazine in butanone solution, whereby there is obtained, after conversion to the free base, the piperazinoethyl ester of 3-thianaphthenecarboxylic acid.

Many of the organic bases of this invention are high-boiling oils which can be purified by distillation in a short-path distillation apparatus at pressures of approximately 0.02 mm. The organic bases of this invention which cannot readily be distilled can be converted to salts for purposes of purification.

The organic bases described herein form non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. For ease of formation and crystallization the organic esters employed for quaternary ammonium salt formation are desirably lower alkyl halides, and alkylene halohydrins such as ethylene bromohydrin. However, other organic esters are suitable for salt formation, and can be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. For the purposes of this invention the free bases are equivalent to their non-toxic acid-addition and quaternary ammonium salts.

The compounds of this invention have valuable pharmacological properties. They are, for example, potent hypotensive agents, and are consequently useful in the treatment of conditions characterized by abnormally elevated blood pressure. They are also anti-viral, anti-bacterial, and anti-fungal agents, and as anti-fungal agents they are particularly effective in inhibiting the growth of *Trichophyton mentagrophytes*. In addition the compounds of this invention are anti-cholinergic agents and are consequently useful for relaxing spasms of the hollow viscera. The compounds also exhibit anti-inflammatory properties as evidenced by their ability to inhibit the formation of granuloma tissue.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), distillation pressures in millimeters (mm.) of mercury and quantities of materials in parts by weight.

*Example 1*

A suspension of 6 parts of 3-thianaphthenecarboxylic acid in 38 parts of chloroform is treated with 6 parts of 2-diisopropylaminoethyl chloride, and the reaction mixture is heated in an open reaction vessel in such a manner that substantially all of the chloroform is removed by distillation at the end of 3 hours and a solid residue remains. If desired, the rate of vaporization of the chloroform can be accelerated by passing a stream of nitrogen over the surface of the reaction mixture. The solid residue is suspended in water, and ice and an excess of solid potassium carbonate are added. The oily free base which forms is extracted with several portions of ether, and the combined ethereal extract is washed with water and concentrated to dryness to yield a pale yellow, oily residue of the 2-diisopropylaminoethyl ester of 3-thianaphthenecarboxylic acid, of the structural formula

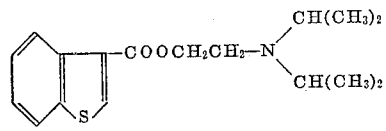

The hydrochloride is obtained by dissolving 5.2 parts of the free base in 20 parts of butanone, adding a slight excess of hydrogen chloride in isopropyl alcohol, and diluting the mixture with ether. Crystallization is induced, and the product is collected on a filter and recrystallized from a mixture of isopropyl alcohol and ether to afford the purified hydrochloride melting at about 170–171° C.

A solution prepared from 4.9 parts of the free base, 5.2 parts of methyl bromide and 75 parts of chloroform is maintained in a sealed reaction vessel at about 60° C. for 5 days. The resulting solution is concentrated, and the product which separates is collected on a filter and washed with ether. Recrystallization from chloroform containing a small amount of ether yields the purified methobromide melting at about 185–186° C.

*Example 2*

A mixture of 6.0 parts of 3-thianaphthenecarboxylic acid, 4.5 parts of 3-dimethylaminopropyl chloride and 38 parts of chloroform in an open reaction vessel is heated in such a manner that substantially all of the chloroform is vaporized over a period of 3 hours. A solution of the solid residue in a minimum quantity of ethanol is diluted with water and extracted with several small portions of chloroform. A small amount of unreacted 3-thianaphthenecarboxylic acid can be recovered from the chloroform extract. The aqueous phase is rendered alkaline by the addition of potassium carbonate, and the free base which separates is extracted with several portions of chloroform. This chloroform extract is concentrated, and the residue is distilled under a pressure of about 0.02 mm. At a bath temperature of about 140–145° C. there is obtained a distillate of the 3-dimethylaminopropyl ester of 3-thianaphthenecarboxylic acid of the structural formula

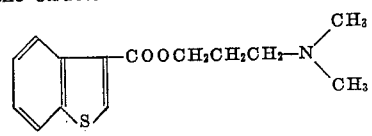

A solution of the free base in a small quantity of acetone is treated with an excess of hydrogen chloride in isopropyl alcohol, and the mixture is diluted with ether and crystallization is induced. This compound is the hydrochloride, which melts at about 180–181° C.

A solution of 1.25 parts of the free base in 8 parts of acetone is treated with 2.3 parts of methyl iodide, and the mixture is allowed to stand at about 25° C. for 15 minutes. The crystalline methiodide which separates is collected on a filter and washed with acetone. It melts at about 200–201° C.

In the same manner, with the substitution of 2 parts of ethyl iodide for the methyl iodide, there is obtained the ethiodide as colorless crystals.

*Example 3*

A mixture of 8.0 parts of 3-thianaphthenecarboxylic acid, 70 parts of isopropyl alcohol and 7.3 parts of 3-diethylaminopropyl chloride is heated under reflux for 24 hours and then concentrated by distillation to about one-half of its original volume. Ether (70 parts) is added and crystallization is induced. The solid product is collected on a filter and recrystallized from a mixture of isopropyl alcohol and ether to yield the purified 3-diethylaminopropyl ester hydrochloride of 3-thianaphthenecarboxylic acid, melting at about 151–153° C.

The free base is obtained by treating a cold, aqueous solution of the hydrochloride with potassium carbonate and extracting with ether. The purified free base is obtained by distilling the residue from the ethereal extract at a pressure of 0.02 mm. and a bath temperature of about 160–165° C. It has the structural formula

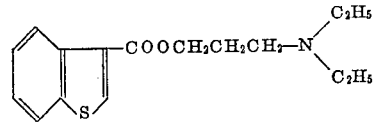

A solution of 4.9 parts of the free base in 45 parts of chloroform is treated with a solution of 1.6 parts of methyl bromide in 30 parts of chloroform, and the mixture in a sealed reaction vessel is heated at about 60° C. for 24 hours. The chloroform is removed by vaporization and the residue is purified by successive crystallizations from a mixture of acetone and ether and from a mixture of isopropyl alcohol and ether to afford the methobromide melting at about 161–162° C.

*Example 4*

A mixture of 6 parts of 3-thianaphthenecarboxylic acid, 6.5 parts of 2-(2,6-dimethylpiperidino)ethyl chloride and 38 parts of chloroform is heated in an open reaction vessel in such a manner that substantially all of the chloroform is removed by distillation over a period of 2–3 hours. A solution of the solid residue in a minimum quantity of ethanol is diluted with several times its volume of water. Ice and potassium carbonate are added, and the oily free base which separates is extracted with several portions of ether. The combined ethereal extract is washed and concentrated to dryness to yield a residue of the 2-(2,6-dimethylpiperidino)ethyl ester of 3-thianaphthenecarboxylic acid of the structural formula

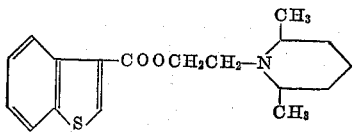

The free base (4.6 parts) dissolved in 20 parts of butanone is treated with a slight excess of hydrogen chloride in isopropyl alcohol, and ether is added for complete separation of the product. The insoluble product is collected and recrystallized from a mixture of ethanol and ether to yield the purified hydrochloride melting at about 230–231° C.

A solution of 4 parts of the free base, 5.2 parts of methyl bromide and 60 parts of chloroform in a sealed reaction vessel is heated at about 60° C. for 4 days. The quantity of insoluble reaction product is increased by diluting the cooled mixture with ether. This product is collected and recrystallized from a mixture of nitromethane and a small quantity of ether to afford the purified methobromide which melts at about 223–224° C.

Example 5

A mixture of 6.0 parts of 3-thianaphthenecarboxylic acid, 38 parts of chloroform and 6.0 parts of 2-(2,5-dimethylpyrrolidino)ethyl chloride is distilled at such a rate that substantially all of the chloroform is removed over a period of 3 hours. A solution of the residue in cold water is made basic with potassium carbonate and extracted with portions of ether and chloroform. The combined organic extract is washed with water and concentrated to dryness. The residue is distilled in a short-path distillation apparatus to yield a distillate of the 2-(2,5-dimethylpyrrolidino)ethyl ester of 3-thianaphthenecarboxylic acid at a pressure of about 0.02 mm. and a bath temperature of about 145° C. This compound has the structural formula

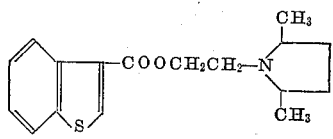

A solution of 3.3 parts of the free base in 24 parts of acetone is treated with a slight excess of hydrogen chloride in isopropyl alcohol and then diluted with ether. The insoluble hydrochloride is collected and recrystallized from a mixtude of isopropyl alcohol and ether. After immersion in a bath preheated to 140° C., this hydrochloride melts at about 173–175° C.

By the foregoing procedure, with the substitution of a solution of hydrogen bromide in isopropyl alcohol for the hydrogen chloride in isopropyl alcohol, there is obtained the water-soluble hydrobromide.

A solution of 2.5 parts of the free base in 38 parts of chloroform is treated with 0.78 part of methyl bromide and the mixture in a sealed reaction vessel is maintained at about 60° C. for 24 hours. The chloroform is then removed by vaporization and the residue is crystallized from acetone and recrystallized from a mixture of nitromethane and ether. The compound obtained in this manner is the hygroscopic methobromide which undergoes a transition point at about 168–169° C. and completely melts at about 184–185° C.

Example 6

A suspension of 5.3 parts of 3-thianaphthenecarboxylic acid in 30 parts of chloroform is treated with 5.3 parts of 2-diallylaminoethyl chloride, and the reaction mixture is heated under reflux for 3 hours and then concentrated to dryness. A solution of the residue in a small amount of methanol is diluted with water and extracted with ether. This ethereal extract is discarded. The cold, aqueous phase is made basic with potassium carbonate and extracted with several portions of ether. This combined ethereal extract is washed with water and concentrated to dryness. The residue is subjected to a short-path distillation. At a pressure of about 0.05 mm. and a bath temperature of 135–140° C. there is obtained a distillate of the 2-diallylaminoethyl ester of 3-thianaphthenecarboxylic acid. This compound has the structural formula

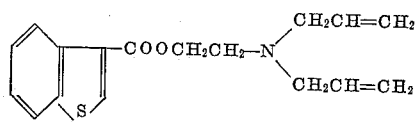

A solution of the free base in the minimum quantity of acetone is treated with a slight excess of hydrogen chloride in isopropyl alcohol and diluted with ether. Crystallization is induced and the product is collected on a filter. This compound is the hydrochloride melting at about 136–138° C.

Example 7

A mixture of 10 parts of 3-thianaphthenecarboxylic acid and 100 parts of thionyl chloride is heated under reflux for 4 hours, after which the mixture is concentrated to dryness by distillation under reduced pressure. In order to remove most of the remaining traces of thionyl chloride, the residue is twice treated with small portions of anhydrous benzene, which are then removed by distillation under reduced pressure. The residual product, which is 3-thianaphthenecarbonyl chloride, is dissolved in 70 parts of anhydrous benzene, and 7.7 parts of 2-bromoethanol is added. The reaction mixture is heated under reflux for 4 hours, after which it is cooled, diluted with ether, and washed successively with cold water, with several portions of saturated sodium bicarbonate solution, and finally with several portions of cold water. The organic phase is concentrated to dryness to afford an oily residue of the β-bromoethyl ester of 3-thianaphthenecarboxylic acid. A solution of this product in 80 parts of butanone is slowly added to a stirred solution of 9.7 parts of piperazine in 160 parts of butanone maintained at about 10–15° C. The reaction mixture is then stirred at about 25° C. for 20 hours and finally heated under reflux for 4 hours. Insoluble piperazine hydrobromide is removed from the cooled mixture by filtration, and the filtrate is concentrated to dryness. A solution of the residue in chloroform is washed with several portions of cold water and is then extracted with several portions of dilute hydrochloric acid. The latter operation is conducted as rapidly as possible in order to minimize separation of the hydrochloride from the aqueous solution. The aqueous solution or suspension is chilled and made alkaline by the addition of potassium carbonate, after which the separated free base is extracted with several portions of chloroform. The combined chloroform extract is washed with water and concentrated under reduced pressure to yield a residue of the β-pierazinoethyl ester of 3-thianaphthenecarboxylic acid of the structural formula

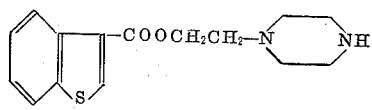

A solution of 3 parts of this free base in 32 parts of acetone is added to a solution of 4 parts of maleic acid in 32 parts of acetone. The insoluble product is collected and purified by recrystallization from water to yield the dimaleate melting at about 153–154° C. This compound behaves as a hydrated material.

Example 8

A mixture of 120 parts of styrene oxide and 71 parts of pyrrolidine is maintained at about 60° C. for 6 hours. Petroleum ether (75 parts) is added and the mixture is allowed to stand for 20 hours at 25° C. The insoluble N-(β-hydroxy-β-phenylethyl)pyrrolidine is collected on a filter and purified by recrystallization from petroleum ether. This product (about 110 parts) is gradually added to a stirred solution of 75 parts of thionyl chloride and 1500 parts of chloroform. When the addition is complete, the mixture is heated under reflux for one hour and then distilled in order to remove most of the chloroform. Toluene is gradually added to replace some of the chloroform which is removed. After the separation of the solid product appears almost complete, the mixture is cooled and the product is collected on a filter. This compound is N-(β-chloro-β-phenylethyl)pyrrolidine hydrochloride which melts at about 165–167° C. An aqueous suspension of this hydrochloride is treated with an excess of potassium carbonate and the resulting organic base is extracted with several portions of chloroform. The combined chloroform extract is washed with water and concentrated to dryness, whereupon there is deposited a residue of N-(β-chloro-β-phenylethyl)pyrrolidine.

A mixture of 8 parts of 3-thianaphthenecarboxylic acid, 10.5 parts of N-(β-chloro-β-phenylethyl)pyrrolidine and 64 parts of isopropyl alcohol is heated under reflux for 24 hours and then concentrated to about one-half of its original volume. Ether (85 parts) is added and, when separation of the crystalline product is complete, it is collected on a filter. By recrystallization from a mixture of ethanol and ether there is obtained the purified 1-phenyl-2-pyrrolidinoethyl ester hydrochloride of 3-thianaphenecarboxylic acid, melting at about 220–221° C.

A solution of this hydrochloride in aqueous methanol is made basic with potassium carbonate and extracted with several portions of chloroform. The combined chloroform extract is washed with water and concentrated to dryness to yield the free base of the structural formula

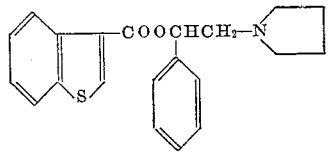

A solution of 6.3 parts of the free base in 75 parts of chloroform is treated with a solution of 7 parts of methyl bromide in 15 parts of chloroform, and the mixture in a sealed reaction vessel is heated at about 60° C. for 72 hours. The mixture is concentrated to dryness and the residue is crystallized from acetone. Recrystallization from a mixture of aqueous isopropyl alcohol and ether yields the methobromide which undergoes a transition point with fusion at about 150° C., then resolidifies and melts at about 219–221° C.

Example 9

A mixture of 4.0 parts of 3-thianaphtheneacetic acid, 3.4 parts of 3-diethylaminopropyl chloride and 23 parts of chloroform is concentrated to dryness by distillation over a period of 4 hours. A solution of the residue in 100 parts of water is washed twice with ether, and the aqueous phase is made basic with potassium carbonate. The basic mixture is extracted with several portions of ether, and the combined ethereal extract is washed with cold water and concentrated to dryness. The residue distilled in a short-path apparatus yields a distillate of the 3-diethylaminopropyl ester of 3-thianaphtheneacetic acid at a pressure of 0.02 mm. and a bath temperature of about 150–155° C. This compound has the structural formula

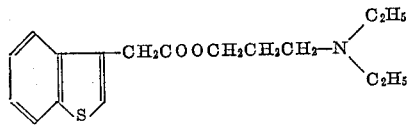

A solution of 2 parts of the free base in 8 parts of acetone is treated with a solution of 2 parts of oxalic acid in 8 parts of acetone, and the mixture is diluted with 70 parts of ether. Crystallization is induced, and the product is collected on a filter. By recrystallization from a mixture of ethanol and ether there is obtained the purified oxalate melting at about 110–112° C.

A solution of 2.7 parts of the free base and 0.84 parts of methyl bromide in 30 parts of chloroform is maintained in a sealed reaction vessel for 24 hours at about 60° C. The contents of the reaction vessel are concentrated to dryness, and the residue is crystallized from a mixture of acetone and ethyl acetate. Recrystallization from a mixture of nitromethane and ethyl acetate yields the purified hygroscopic methobromide which melts at about 105–107° C.

Example 10

A solution of 3.8 parts of 3-thianaphtheneacetic acid, 2.5 parts of 2-dimethylaminopropyl chloride and 24 parts of isopropyl alcohol is heated under reflux for 24 hours and then concentrated to dryness. An aqueous suspension of the residue is extracted with ether, and this ethereal extract is discarded. The aqueous phase is chilled, made basic with potassium carbonate, and extracted with several portions of ether. This combined ethereal extract is washed with cold water and concentrated to dryness. The residue is distilled in a short-path apparatus at a pressure of about 0.02 mm. At a bath temperature of about 150° C. there is obtained a distillate of the 2-dimethylaminopropyl ester of 3-thianaphtheneacetic acid as an oil of the structural formula

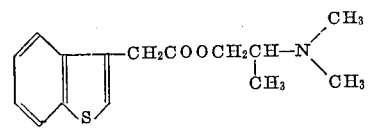

Example 11

A solution of 4.0 parts of 3-thianaphtheneacetic acid, 3.7 parts of 2-(2,5-dimethylpyrrolidino)ethyl chloride and 24 parts of isopropyl alcohol is heated under reflux for 24 hours and then concentrated to dryness. Repeated crystallizations of the residue from mixtures of acetone and ether yield the 2-(2,5-dimethylpyrrolidino)ethyl ester hydrochloride of 3-thianaphtheneacetic acid melting at about 123–131° C.

An aqueous solution of the hydrochloride is made basic with potassium carbonate and extracted with several portions of ether. The combined ethereal extract is washed with cold water and concentrated to dryness. By distillation of the residue in a short-path apparatus at a pressure of 0.04 mm., there is obtained at a bath temperature of about 165–170° C. the free base of the structural formula

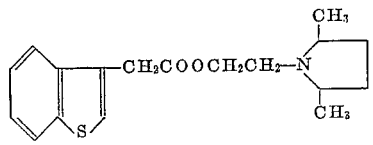

A solution of 2.6 parts of the free base and 2 parts of methyl bromide in 30 parts of chloroform is placed in a sealed reaction vessel and maintained at about 60° C. for 72 hours. The mixture is concentrated to dryness and the oily residue is crystallized from acetone. Purification by recrystallization from a mixture of isopropyl alcohol and ether yields the purified methobromide melting at about 166–168° C.

Example 12

A solution of 4.0 parts of 3-thianaphtheneacetic acid, 4.1 parts of 2-(2,6-dimethylpiperidino)ethyl chloride and 23 parts of chloroform is concentrated to dryness by distillation over a period of 2–4 hours. A solution of the residue in a minimum quantity of methanol is diluted with 100 parts of water and extracted with ether. This ether extract is discarded. The chilled aqueous phase is made basic with potassium carbonate, and the organic free base which results is extracted with several portions of ether. The combined ethereal extract is washed with water and concentrated to dryness. By distillation of the residue in a short-path apparatus, there is obtained at a pressure of about 0.02 mm. and a bath temperature of about 190° C. a distillate of the 2-(2,6-dimethylpiperidino)ethyl ester of 3-thianaphtheneacetic acid of the formula

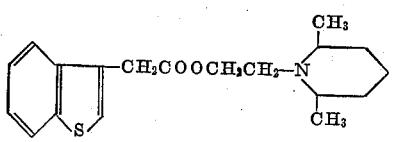

A solution of 2.7 parts of the free base in 12 parts of acetone is treated with a slight excess of hydrogen chloride in isopropyl alcohol. Ether (15 parts) is added and crystallization is induced. The insoluble product is collected and recrytallized from a mixture of isopropyl alcohol and ether to afford the purified hydrochloride which melts at about 172–173° C.

A solution of 2.4 parts of the free base and 3.5 parts of methyl bromide in 30 parts of chloroform is placed in a sealed reaction vessel and maintained at about 60° C. for 72 hours. The mixture is concentrated to dryness, and the residue is crystallized from a mixture of acetone and ether or from ethyl acetate. Recrystallization from a mixture of nitromethane and ethyl acetate yields the methobromide melting over a range from about 155–175° C.

Example 13

A mixture of 8 parts of 3-thianaphthenepropionic acid, 80 parts of isopropyl alcohol and 6.4 parts of 3-diethylaminopropyl chloride is heated under reflux for 24 hours and then concentrated to dryness. A solution of the residue in cold water is made basic with potassium carbonate, and the organic free base is extracted with several portions of ether. The combined ethereal extract is washed with water and concentrated to dryness. By distillation of the residue in a short-path apparatus at a pressure of 0.02 mm., there is obtained at a bath temperature of about 170–175° C. a distillate of the 3-diethylaminopropyl ester of 3-thianaphthenepropionic acid of the structural formula

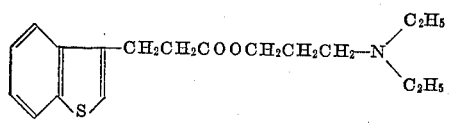

By treatment of a solution of the free base in ethanol with a slight excess of hydrogen chloride in isopropyl alcohol, followed by dilution with ether, there is obtained a water-soluble hydrochloride.

Example 14

A mixture of 3.7 parts of 3-thianaphthenebutyric acid, 2.3 parts of 3-dimethylaminopropyl chloride and 30 parts of chloroform is distilled to dryness over a period of 3–4 hours. A solution of the residue in a minimum quantity of ethanol is diluted with water and extracted with several small portions of chloroform, which are discarded. The aqueous phase is made basic with potassium carbonate, and the free base which separates is extracted with several portions of chloroform. This chloroform extract is concentrated, and the residue is distilled under a pressure of about 0.02 mm. At a bath temperature of about 190–195° C. there is obtained a distillate of the 3-dimethylaminopropyl ester of 3-thianaphthenebutyric acid of the structural formula

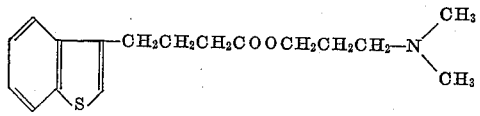

The methiodide is obtained by dissolving 1 part of the free base in acetone, treating the solution with 2.3 parts of methyl iodide, and allowing the mixture to stand at about 25° C. for about 18 hours.

Example 15

A mixture of 8.0 parts of 2-thianaphthenecarboxylic acid, 7.7 parts of 2-diisopropylaminoethyl chloride and 45 parts of chloroform is distilled to dryness over a period of 3 hours. A solution of the solid residue in 150 parts of water is washed with a small amount of ether and then made basic with potassium carbonate. The organic free base is extracted with several portions of ether, and the combined ethereal extract is washed with cold water and concentrated to dryness. The residue remaining after vaporization of the ether is distilled in a short-path apparatus at 0.02 mm. At a bath temperature of about 150° C. there is obtained a distillate of the 2-diisopropylaminoethyl ester of 2-thianaphthenecarboxylic acid of the structural formula

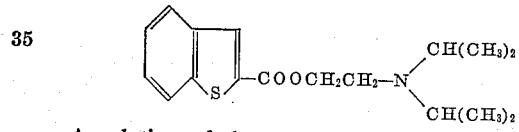

A solution of 6 parts of the free base in 24 parts of acetone is treated with a slight excess of hydrogen chloride in isopropyl alcohol and diluted with 22 parts of ether. The insoluble product is collected and recrystallized from a mixture of ethanol and ether to yield the hydrochloride melting at about 205–206° C.

In a sealed reaction vessel, a solution of 6.3 parts of the free base, 100 parts of chloroform and 1.96 parts of methyl bromide is maintained at about 60° C. for 5 days. The cooled mixture is then diluted with an equal volume of ether, and the insoluble product is collected. By recrystallization from a mixture of nitromethane and ethyl acetate there is obtained the purified methobromide melting at about 200–201° C.

Example 16

A solution of 8.0 parts of 2-thianaphthenecarboxylic acid, 64 parts of isopropyl alcohol and 7.3 parts of 3-diethylaminopropyl chloride is heated under reflux for 24 hours and then concentrated to dryness. A solution of the residue in 200 parts of water is washed with small portions of ether, which are discarded. The chilled aqueous phase is made basic with potassium carbonate and extracted with several portions of ether. The residue obtained after washing the combined ethereal extract with water and concentrating it to dryness is purified by distillation in a short-path apparatus at a pressure of 0.02 mm. At a bath temperature of about 155–160° C. there is obtained a distillate of the 3-diethylaminopropyl ester of 2-thianaphthenecarboxylic acid, of the structural formula

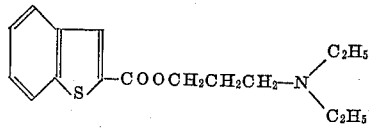

A solution of 5.2 parts of the free base in 30 parts of acetone is treated with a slight excess of hydrogen chloride in isopropyl alcohol and diluted with 24 parts of ether. Crystallization is induced, and the product is collected and recrystallized from a mixture of isopropyl alcohol and ether. There is thus obtained the hydrochloride which melts at about 144–145° C.

In a sealed reaction vessel, a solution of 5.2 parts of the free base, 1.7 parts of methyl bromide and 80 parts of chloroform is maintained at about 60° C. for 24 hours. The residue obtained by vaporization of the solvents is crystallized from acetone and then from a mixture of isopropyl alcohol and ether to yield the methobromide melting at about 163–164° C.

*Example 17*

A solution of 6.0 parts of 2-thianaphthenecarboxylic acid, 32 parts of isopropyl alcohol and 4.5 parts of 2-dimethylaminopropyl chloride is heated under reflux for 24 hours and then concentrated to dryness. The residue is partitioned between water and ether, and the ethereal phase is discarded. The chilled aqueous phase is made basic with potassium carbonate and extracted with several portions of ether. The residue obtained by washing the combined ethereal extract with water and concentrating it to dryness is distilled in a short-path apparatus at 0.02 mm. At a bath temperature of about 150° C. there is obtained a distillate of the 2-dimethylaminopropyl ester of 2-thianaphthenecarboxylic acid, which has the structural formula

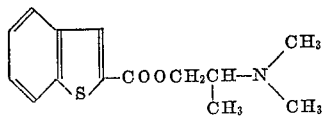

To a solution of 5.4 parts of the free base in a minimum quantity of acetone there is added a hot, saturated solution of 5 parts of oxalic acid in acetone. Ethyl acetate is added until a turbidity persists, after which crystallization is induced and the mixture is refrigerated for complete separation of product. The product is collected and recrystallized from a mixture of nitromethane and ether. This compound is the oxalate which decomposes with fusion over a range from about 150–165° C.

*Example 18*

A solution of 8.0 parts of 2-thianaphthenecarboxylic acid, 64 parts of isopropyl alcohol and 10.5 parts of N-(β-chloro-β-phenylethyl)pyrrolidine is heated under reflux for 24 hours and then concentrated to about one-half of its original volume. Ether (85 parts) is added and crystallization is induced. The product is collected and recrystallized from a mixture of ethanol and ether, whereby there is obtained the 1-phenyl-2-pyrrolidinoethyl ester hydrochloride of 2-thianaphthenecarboxylic acid. This compound melts at about 201–202° C.

A solution of the hydrochloride in a minimum quantity of methanol is diluted with ice water and made basic with potassium carbonate. The organic free base is extracted with several portions of chloroform, and the combined chloroform extract is washed with cold water and concentrated to dryness. The residue obtained is the crude free base of the structural formula

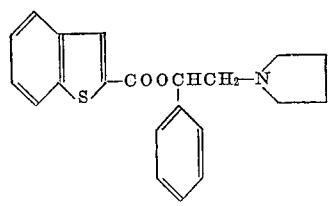

A solution of 4.7 parts of the free base, 3 parts of methyl bromide and 90 parts of chloroform is heated in a sealed reaction vessel for 72 hours at about 60° C. Crystallization is induced in the cooled mixture, and the insoluble product is collected and recrystallized from a mixture of ethanol and ether to yield the purified methobromide which melts at about 223–224° C.

*Example 19*

A mixture of 8.0 parts of 2-thianaphthenecarboxylic acid, 45 parts of chloroform and 8.0 parts of 2-(2,5-dimethylpyrrolidino)ethyl chloride is distilled to dryness over a period of about 2 hours, and the oily residue is crystallized from acetone. By recrystallization from a mixture of ethanol and ether there is obtained the purified 2-(2,5-dimethylpyrrolidino)ethyl ester hydrochloride of 2-thianaphthenecarboxylic acid melting at about 189–190° C.

A solution of the hydrochloride in ice water is made basic with potassium carbonate and extracted with several portions of ether. The combined ethereal extract is washed with water and concentrated to dryness. The residue is distilled in a short-path apparatus at a pressure of about 0.03 mm. At a bath temperature of about 155–160° C. there is obtained a distillate of the free base of the structural formula

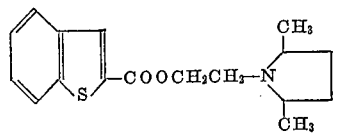

A solution of 3.9 parts of the free base and 3 parts of methyl bromide in 75 parts of chloroform is heated in a sealed reaction vessel for 72 hours at about 60° C. The solvents are removed by vaporization, and the residual oil is crystallized from acetone. By recrystallization from a mixture of nitromethane and ethyl acetate there is obtained the methobromide as a crystalline material which decomposes with fusion, principally in the range of about 170–180° C.

*Example 20*

A mixture of 8.0 parts of 2-thianaphthenecarboxylic acid, 45 parts of chloroform and 8.8 parts of 2-(2,6-dimethylpiperidino)ethyl chloride is concentrated to dryness by distillation over a period of about 2 hours. A solution of the residue in hot water is chilled with ice, made basic with potassium carbonate and extracted with several portions of ether. The combined ethereal extract is washed with water and concentrated to dryness. The residue obtained from the ethereal extract is distilled in a short-path apparatus at a pressure of 0.02 mm., whereby there is obtained at a bath temperature of about 190° C. a distillate of the 2-(2,6-dimethylpiperidino)ethyl ester of 2-thianaphthenecarboxylic acid, of the structural formula

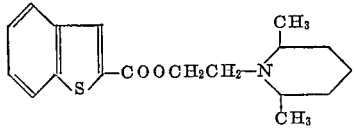

A solution of 5 parts of the free base in 20 parts of acetone is treated with a slight excess of hydrogen chloride in isopropyl alcohol. Crystallization is induced, and the insoluble product is collected and recrystallized from a mixture of ethanol and ether. There is thus obtained the purified hydrochloride which melts at about 232–233° C.

A solution of 4.0 parts of the free base, 60 parts of chloroform and 5.2 parts of methyl bromide is heated in a sealed reaction vessel for 72 hours at about 60° C. The solvents are removed by vaporization, and the residue is recrystallized from a mixture of ethanol and ether to yield the purified methobromide melting at about 229–230° C.

*Example 21*

While a mixture of 5.0 parts of 2-thianaphtheneacetic acid, 38 parts of chloroform and 4.2 parts of 2-piperidinoethyl chloride is maintained at or near the reflux temperature, the chloroform is vaporized by passing a stream of nitrogen over the surface of the mixture. About 2–3 hours is a satisfactory period of time for this operation. A solution of the residue in water is chilled and made basic with potassium carbonate, after which the separated free base is extracted with several portions of ether. The combined ethereal extract is washed and concentrated to dryness to yield a residue of the 2-piperidinoethyl ester of 2-thianaphtheneacetic acid of the structural formula

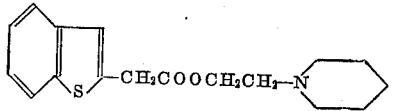

A water-soluble hydrobromide is obtained by treating a solution of the free base in a minimum quantity of ethanol with a slight excess of hydrogen bromide in isopropyl alcohol, followed by diluting the mixture with ether.

*Example 22*

A mixture of 2.5 parts of 2-thianaphthenevaleric acid, 40 parts of isopropyl alcohol and 1.75 parts of 3-diethylaminopropyl chloride is heated under reflux for 24 hours and then concentrated to dryness. A solution of the residue in water is chilled and made basic with potassium carbonate. The organic free base which results is extracted with several portions of ether, and the combined ethereal extract is washed with water and concentrated to dryness under reduced pressure. In this manner there is obtained the 3-diethylaminopropyl ester of 2-thianaphthenevaleric acid, of the structural formula

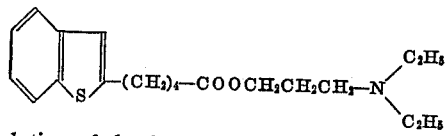

A solution of the free base in a minimum quantity of ethanol is treated with a slight excess of hydrogen chloride in isopropyl alcohol, and the mixture is diluted with ether. When separation of the insoluble product is complete, it is collected and washed. This compound is the water-soluble hydrochloride.

By the substitution of an equal weight of 3-thianaphthenevaleric acid for the 2-thianaphthenevaleric acid in the foregoing procedures, there are obtained the 3-diethylaminopropyl ester of 3-thianaphthenevaleric acid, and its hydrochloride.

What is claimed is:

1. A member of the class consisting of bases and non-toxic salts thereof, said bases having the structural formula

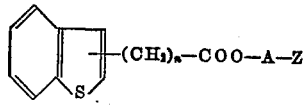

wherein $n$ is a member of the class consisting of zero and positive integers less than five; A is a member of the class consisting of alkylene and phenyl-substituted alkylene radicals containing fewer than nine carbon atoms and separating the groups attached thereto by at least two carbon atoms; and Z is a member of the class consisting of di-(lower)alkylamino, diallylamino, piperazino, piperidino, pyrrolidino, and alkyl-substituted piperidino and pyrrolidino radicals in which the nuclear alkyl substituents total fewer than 3 carbon atoms.

2. A compound of the structural formula

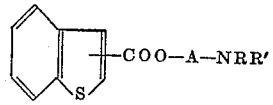

wherein A is a trimethylene radical and R and R' are lower alkyl radicals.

3. The 3-diethylaminopropyl ester of 2-thianaphthenecarboxylic acid.

4. A compound of the structural formula

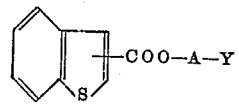

wherein A is an ethylene radical and Y is a dimethylpyrrolidino radical.

5. A compound of the structural formula

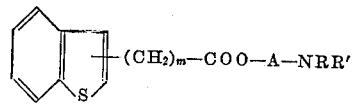

wherein $m$ is a positive integer less than five; A is a trimethylene radical; and R and R' are lower alkyl radicals.

6. The 2-(2,5-dimethylpyrrolidino)ethyl ester of 3-thianaphthenacetic acid.

7. A compound of the structural formula

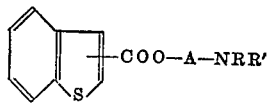

wherein A is an ethylene radical, and R and R' are lower alkyl radicals.

8. The 2-diisopropylaminoethyl ester of 3-thianaphthenecarboxylic acid.

9. The 3-diethylaminopropyl ester of 3-thianaphtheneacetic acid.

10. The β-piperazinoethyl ester of 3-thianaphthenecarboxylic acid.

11. A compound of the structural formula

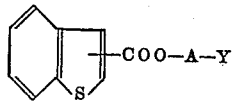

wherein A is a phenylethylene radical and Y is a pyrrolidino radical.

12. The 1-phenyl-2-pyrrolidinoethyl ester of 3-thianaphthenecarboxylic acid.

References Cited in the file of this patent

UNITED STATES PATENTS

| | | |
|---|---|---|
| 2,652,399 | Clinton | Sept. 15, 1953 |
| 2,686,186 | Leonard | Aug. 10, 1954 |

OTHER REFERENCES

Blicke et al.: Chem. Abst., vol. 43, col. 1396 (1949).